United States Patent
Nulkar et al.

(10) Patent No.: US 7,707,369 B2
(45) Date of Patent: Apr. 27, 2010

(54) SYSTEM FOR CREATING AND TRACKING UNIQUE IDENTIFICATIONS OF ELECTRONIC COMPONENTS

(75) Inventors: Chaitanya Nulkar, Sunnyvale, CA (US); Dave Wong, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 363 days.

(21) Appl. No.: 11/537,183

(22) Filed: Sep. 29, 2006

(65) Prior Publication Data
US 2008/0082767 A1   Apr. 3, 2008

(51) Int. Cl.
  G06F 13/00  (2006.01)
  G06F 7/16   (2006.01)
(52) U.S. Cl. .................. 711/156; 711/170; 700/215
(58) Field of Classification Search ........... 711/156
See application file for complete search history.

(56) References Cited

U.S. PATENT DOCUMENTS

| | | | |
|---|---|---|---|
| 7,152,139 B1* | 12/2006 | Barrett | 711/103 |
| 2005/0198449 A1* | 9/2005 | Haskell et al. | 711/156 |
| 2006/0253764 A1* | 11/2006 | Kobayashi et al. | 714/746 |
| 2007/0124413 A1* | 5/2007 | Diab et al. | 709/217 |

OTHER PUBLICATIONS

"Jedec Publication—Standard Manufacturer's Identification Code." JEP106R (Revision of JEP106Q) Jul. 2005.
"4.20.7—184-Pin PC2700/PC3200 SDRAM Registered DIMM Design Specification." Revision 2.0 Jan. 2004.

* cited by examiner

*Primary Examiner*—Hetul Patel
(74) *Attorney, Agent, or Firm*—Perkins Coie LLP (57) ABSTRACT

A system for creating and tracking intelligent unique identifications for memory devices is disclosed. Each memory device includes stored configuration information having a plurality of fields. A storage operating system selectively creates an intelligent unique identification for each memory device in the storage system using the fields in the stored configuration information. The intelligent unique identification may then be stored for tracking and later retrieval.

25 Claims, 7 Drawing Sheets

SYSTEM FOR CREATING AND TRACKING UNIQUE IDENTIFICATIONS OF ELECTRONIC COMPONENTS

FIELD OF INVENTION

The present invention relates to an apparatus and method for creating and tracking unique identification of electronic components, such as memory devices. The unique identification may be used for hardware management, inventory tracking, or troubleshooting.

BACKGROUND

A data storage system is a computer and related storage medium that enables storage or backup of large amounts of data. Storage systems, also known as storage appliances or storage servers, may support network attached storage (NAS) or storage area network (SAN) computing environments. A NAS is a computing environment where files-based access is provided through a network typically in a client/server configuration. A SAN is a computing environment where a network transfers block based data between computer systems and storage media via peripheral channels such as a small computer system interface (SCSI), a fiber channel, or an Ethernet connection, as desired.

Figure 1A:
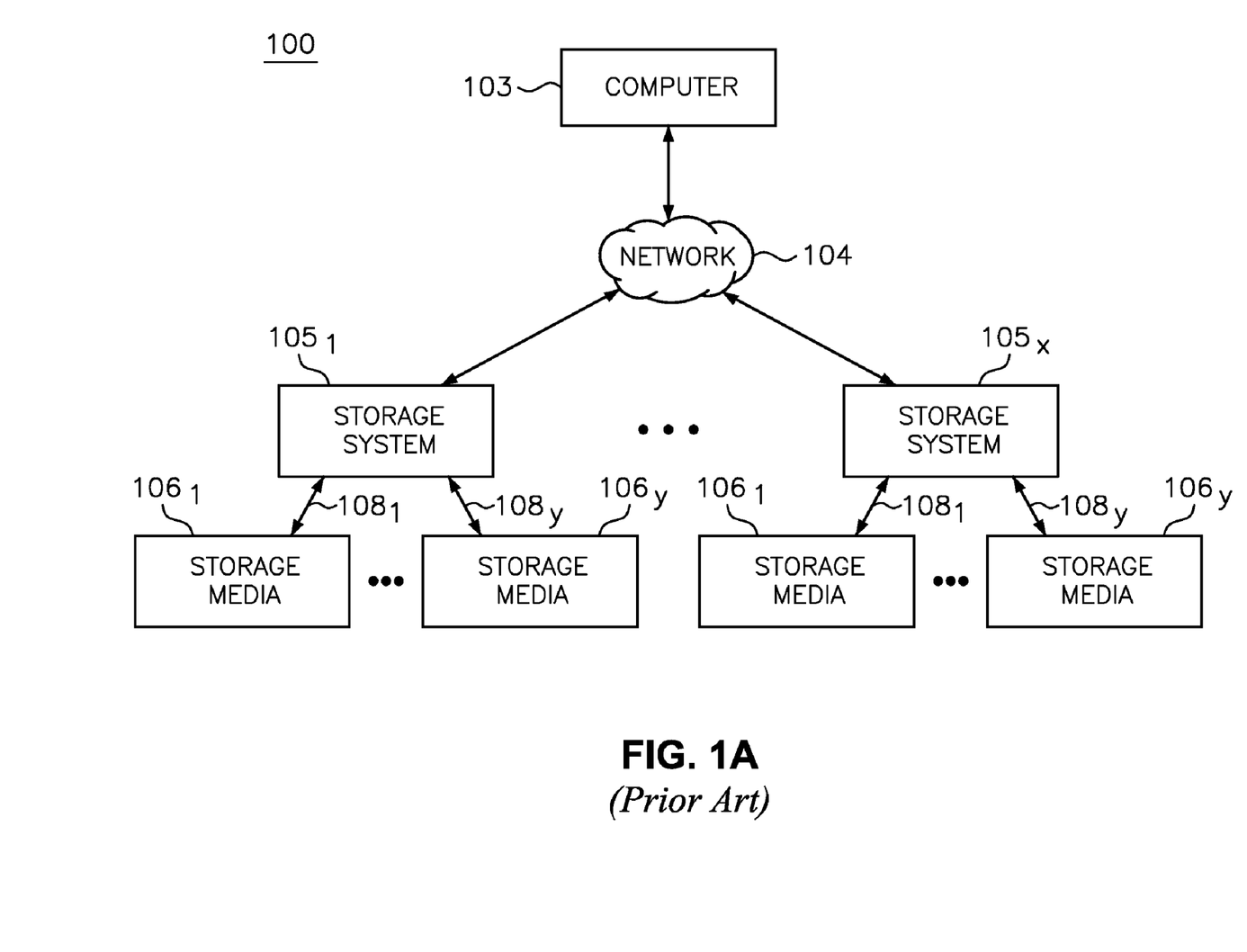
FIG. 1A is a block diagram of a conventional storage computing environment.

FIG. 1A is an example of a conventional storage computing environment 100. Computer 103 communicates read requests, write requests, or any messages to storage systems $105_1$ to $105_x$ over network 104 to access information stored in at least one of storage media $106_1$ to $106_y$ via electronic couplings $108_1$ to $108_y$. The storage media $106_1$ to $106_y$ may be any one of a tape library, a disk library, an optical media library, or a virtual storage library used to backup data. Network 104 may be wired, wireless, or a computer bus, as desired.

Figure 1B:
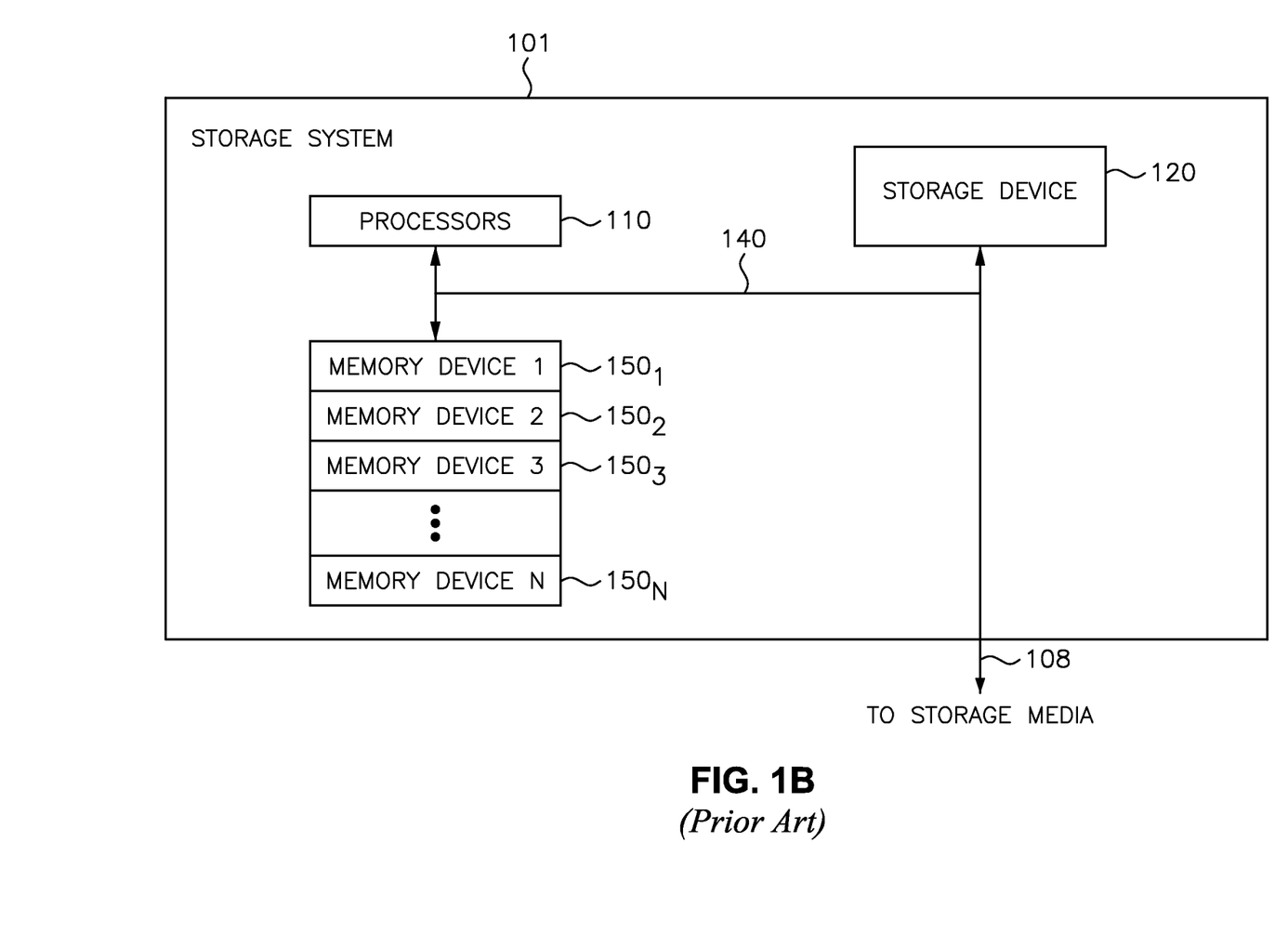
FIG. 1B is a block diagram of a conventional storage system.

FIG. 1B is an example of a conventional storage system 101. The storage system 101 includes one or more processors 110, a storage device 120, memory devices $150_1$, $150_2$, $150_3$, ... $150_N$ and a communication bus 140. The memory devices $150_1$ to $150_N$ are typically memory modules, such as dual in-line memory modules (DIMMs). Different types of DIMMs may include, but are not limited to, synchronous dynamic random access memory (SDRAM), double data rate (DDR) SDRAM, DDR1, DDR2, DDR3, or Rambus® DRAM (RDRAM).

Storage systems are typically configured using hardware components and field replaceable units (FRUs) from a plurality of manufacturers. Each hardware component is typically manufactured with a serial number for hardware management, inventory tracking, or troubleshooting. However, the serial numbers may not be unique among the plurality of manufacturers, or even with the same manufacturer. For example, some manufacturers reset their serial numbers on a periodic basis, which may be as short as a week. This could leave multiple components with the same serial number, thereby making it difficult to distinguish among a plurality of hardware components across a plurality of products.

As a further example, storage system 100 has a plurality of memory devices $150_1$ to $150_N$ which may have duplicate serial numbers. Even if each of the plurality of memory devices has a separate serial number when originally installed within the storage system 100, replacement of any one of memory devices $150_1$ to $150_N$ may introduce duplicate serial numbers. Whether or not a serial number is a duplicate, it would also be beneficial for a storage system to be able to track specific memory devices $150_1$ to $150_N$, or any electronic components, which are deployed within the field in the event that there is a need to specifically identify where a particular memory device $150_1$ to $150_N$ was installed. Therefore, a need exists for uniquely identifying a plurality of electronic components in a storage system or server.

SUMMARY

A system for creating and tracking intelligent unique identifications for memory devices is disclosed. Each memory device includes stored configuration information having a plurality of fields. A storage operating system selectively creates an intelligent unique identification for each memory device in the storage system using the fields in the stored configuration information. The intelligent unique identification may then be stored for tracking and later retrieval.

BRIEF DESCRIPTION OF THE DRAWINGS

A more detailed understanding of the invention may be had from the following description of the exemplary embodiments, given by way of example, and to be understood in conjunction with the accompanying drawings, wherein.

DETAILED DESCRIPTION OF THE EXEMPLARY EMBODIMENTS

The present invention will be described with reference to the drawing figures wherein like numerals represent like elements throughout. Purely by way of example, the embodiments are described utilizing memory devices as exemplary electronic components. However, since stored configuration information is found for most electronic components, the intelligent unique identification and the process of providing the intelligent unique identification given below may be implemented for a plurality of electronic components such as processors, Field Programmable Gate Arrays (FPGAs), flash memories, disk drives, tape drives, or the like. Moreover, any software or hardware module may create the unique identification number in the examples given below.

As used hereinafter, the term "intelligent unique identification" or "unique identifier" refers to a scheme for providing an identification for any electronic component that is unique from the identification for any other electronic component by selectively extracting information from that component. As will be described in detail hereinafter, at least a portion of the extracted information preferably relates to the manufacture of the component such as the manufacturer, date of manufacture, place of manufacture, etc., which may be provided in an alphanumeric serial number format to uniquely identify any electronic component.

Figure 2A:
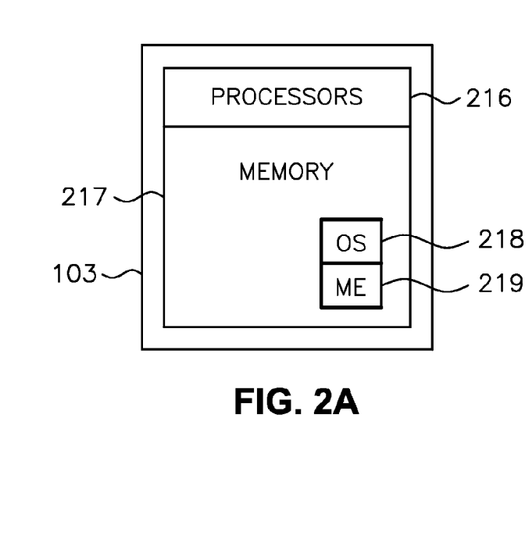
FIG. 2A is a block diagram of a computer in accordance with the present invention.

FIG. 2A is a block diagram of a computer 103 used in accordance with the present invention. The computer 103 includes at least a processor 216 and a memory device 217 having operating system 218. The memory device 217 may be cache memory. The operating system 218 may include a management entity 219, such as a firmware or software module, for performing and supporting management functions such as troubleshooting or tracking in accordance with the present invention. Exemplary operating systems include Microsoft Windows, UNIX, or any operating system configured to perform in a storage computing environment. For example, Data ONTAP® is an operating system commercially available by Network Appliance, Inc., Sunnyvale, Calif. which may be implemented in exemplary embodiments of the present invention.

Figure 2B:
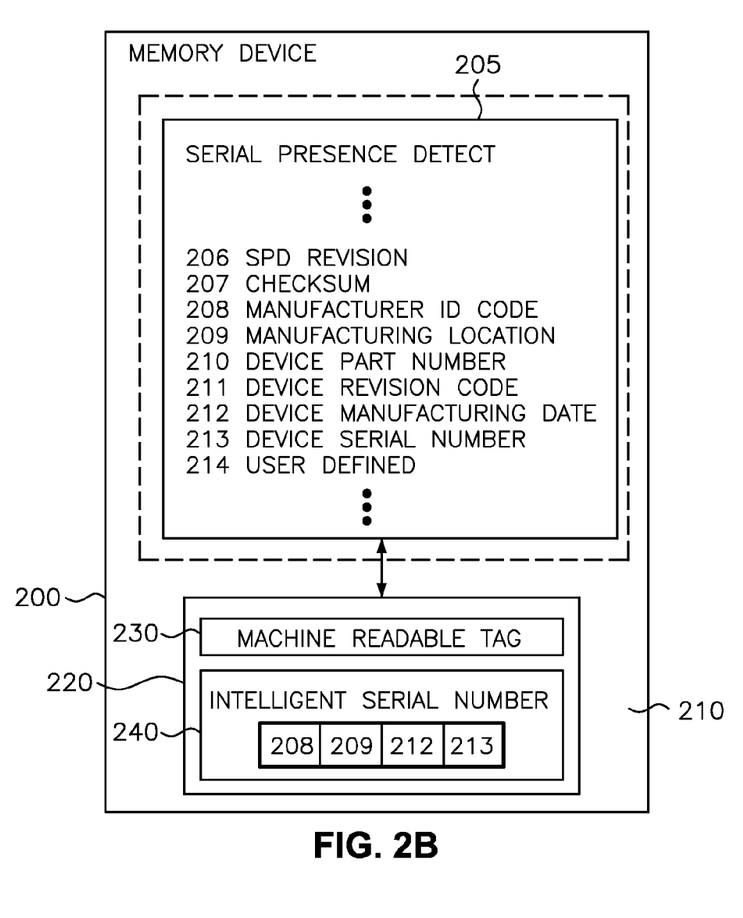
FIG. 2B is a memory device having an intelligent unique identification in accordance with one embodiment of the present invention.

FIG. 2B is an illustration of a memory device 200 in accordance with one embodiment of the present invention. Memory device 200 may be a dual in-line memory module (DIMM). Memory device 200 includes configuration information stored in the serial presence detect (SPD) table 205. The SPD table 205 is a configuration table having a plurality of data fields, such as fields 206-214. Configuration or specification information is stored in specific fields, such as fields 206-214 (which may be stored in read-only memory (ROM)) on the memory device 200. The configuration information in SPD table 205 is typically used by the basic input/output system (BIOS) of a computer to configure a memory controller (not shown) to properly operate memory device 200 for maximum reliability and performance. It should be noted that memory device 200 may also have other stored configuration tables which may be used for providing the source of information for an intelligent unique identification.

Fields 206 to 214 include information that is defined by the Joint Electron Device Engineering Council (JEDEC) standardization body. Although standardized, the data type formats, such as binary coded decimal (BCD), hexadecimal, or American Standard Code for Information Interchange (ASCII), of information in fields 206-214 may be implementation specific, and thus, are not always defined by the JEDEC standard. Therefore, in order for the operating system 218 to consistently read usable information for providing an intelligent unique identification, information in fields 206-214 is preferably stored in a predetermined data type format. The predetermined data type formats includes at least one of binary coded decimal (BCD), hexadecimal, or American Standard Code for Information Interchange (ASCII), or the like, which may be predetermined during production. Each of the fields 206-214 may have varying data length sizes, such as one to eighteen bytes, and there may also be fields additional in SPD 205.

In SPD table 205, field 206 provides the SPD revision number; field 207 provides a checksum of information in the SPD table 205 for error correction purposes; field 208 provides the manufacturer ID code; field 209 provides the manufacturing location; field 210 provides the memory device part number (which may be customer specific); field 211 provides the memory device revision code; field 212 provides the memory device manufacturing date; field 213 provides the device serial number; and field 214 provides user defined information.

In one embodiment of the present invention, the intelligent unique identification comprises information which is selectively extracted from the SPD fields 208, 209, 212, and 213, and then combined in a predetermined format. However, those of skill in the art would realize that any combination of fields desired by a user could be employed as long as they provide a unique identifier or indicator.

An example of an intelligent unique identification for an electronic component in a predetermined format may be "A1-46-0515-06052010". The value "A1" represents a certain manufacturer's identification code in hexadecimal format. The value "46" represents that the electronic component was manufactured at a particular manufacturing location represented in hexadecimal format. The value "0515" represents that the electronic component was manufactured in the 15$^{th}$ week of 2005 represented in binary coded decimal format. The value "06052010" is the electronic component's serial number in hexadecimal format.

An intelligent unique identification 220 may be displayed on the exterior or outer portion 210 of the memory device 200 in a human readable format 240. The human readable format 240 may be a label or a silk screen printing onto the outer portion 210. In addition, the unique identification 220 can be encoded in machine readable format on a machine readable tag 230. The tag 230 may be a barcode or radio frequency identification (RFID) tag that is machine readable using a scanner or electronic reader. Identification tags 230 and 240 may be generated at a manufacturing site for a memory device prior to assembling a storage system. The human readable format 240 and tag 230 may be used by a field technician for hardware management, inventory tracking, or troubleshooting throughout a memory device's product life cycle.

Figure 3A:
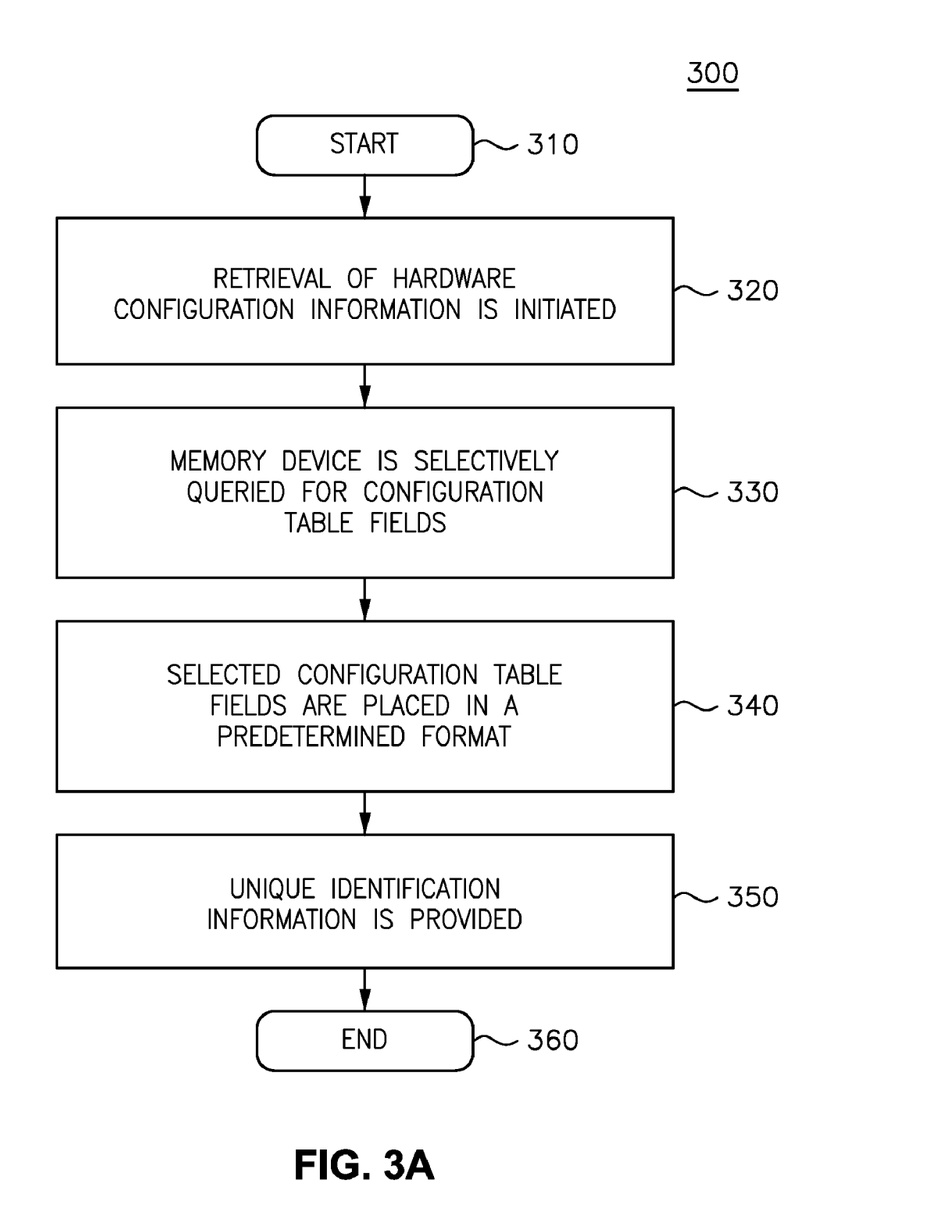
FIG. 3A is a flow diagram of a process for creating and retrieving an intelligent unique identification of a memory device in accordance with another embodiment of the present invention.

FIG. 3A is a flow diagram of a process 300 for creating and retrieving an intelligent unique identification of a memory device comprising steps 310, 320, . . . 360 in accordance with an embodiment of the present invention. In step 320, retrieval of hardware configuration information is initiated. Retrieval may be initiated by a user inputting a command to the operating system 218, or to any other software module, to retrieve hardware configuration information. For instance, system command "sysconfig -M" may be used in the Data ONTAP® operating system.

In step 330, a memory device is selectively queried for information located within configuration table fields. For instance, the memory device 200 may be selectively queried for information in SPD fields 208, 209, 212, and 213 by operating system 218. Preferably, this information is in a predetermined data type format as described above. In an alternative embodiment, if the information in the SPD table 205 is not in a predetermined data type format, the operating system 218 or any software module may convert them into a proper data type format.

In step 340, the selected configuration table fields are then combined and placed in a predetermined format to generate the unique identification. For example, for memory device 200 the operating system 218 may place the predetermined SPD fields 208, 209, 212, and 213 into a unique alphanumeric serial number display format with hyphens separating each field.

In step 350, the unique identification information is provided to a user. This providing step may comprise the operating system 218 displaying the intelligent serial number 220, (and optionally other hardware configuration information), visually to the user via the computers 103 graphical user interface. Alternatively, the operating system may store the unique identification in a database in memory 217 as a result of the retrieval request in step 320.

The electronic querying of memory device 200, as provided in FIG. 3A, is advantageous since the user or system manager is not required to shut down a storage system in order to access and identify the memory device within the storage system. In another embodiment, the electronically queried intelligent unique identification may be stored in a local database, which may reside in storage device 120, at an assembly site prior to shipping for tracking purposes.

Figure 3B:
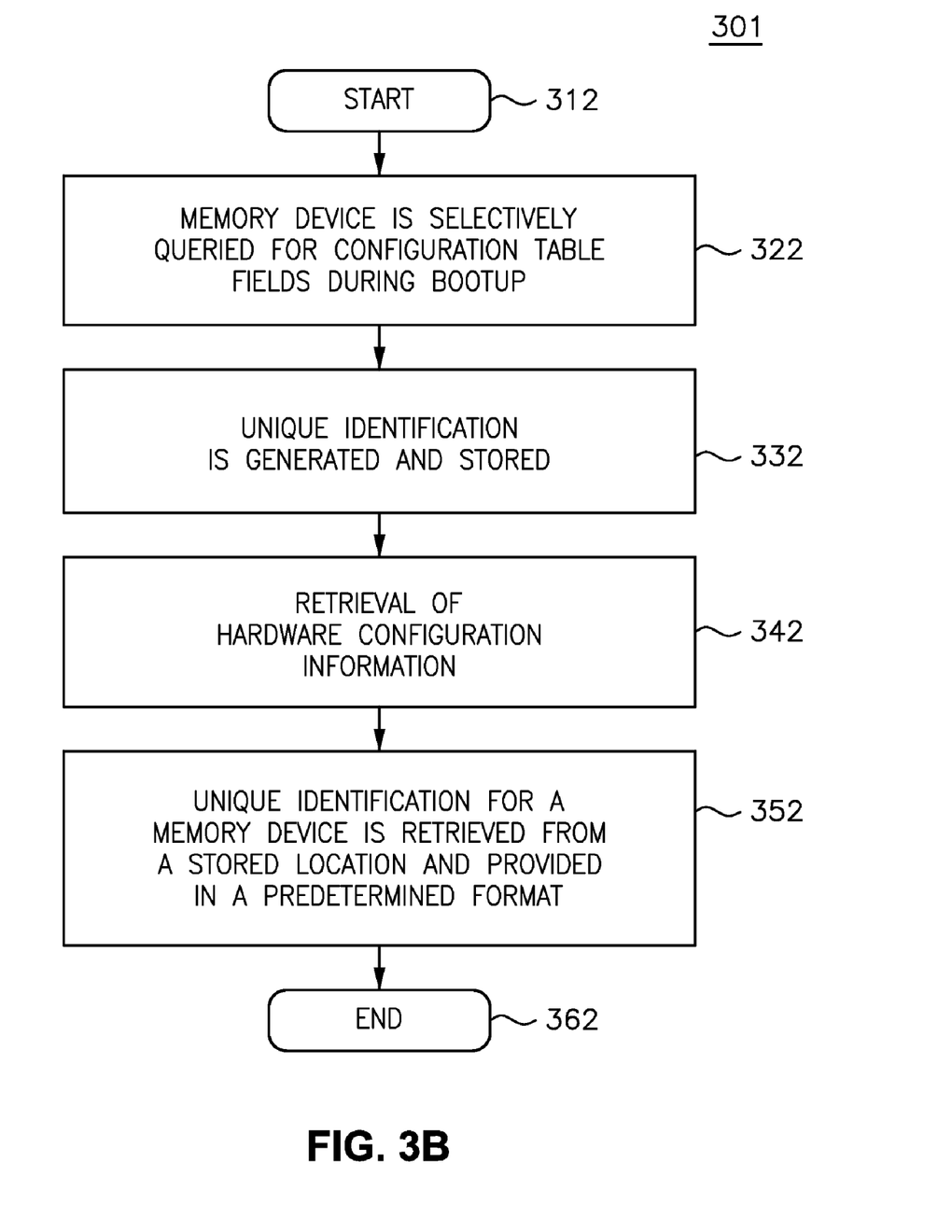
FIG. 3B is a flow diagram of a process for generating and storing an intelligent unique identification of a memory device during system bootup in accordance with another embodiment of the present invention.

FIG. 3B is a flow diagram of a process 301 for generating and storing an intelligent unique identification of a memory device during system bootup comprising steps 312, 322, . . . 362 in accordance with another embodiment of the present invention. In step 322, a memory device is selectively queried for information in configuration table fields during bootup. For memory device 200, operating system 218 or management entity 219 selectively queries predetermined SPD fields 208, 209, 212, and 213, which are stored in a predetermined data type format, during system bootup. The querying may be performed by operating system 218 during a power-on self test (POST). In an alternative embodiment, if the predetermined SPD fields 208, 209, 212, and 213 are not in a predetermined data type format readable by software, a software module or an operating system may convert them into a proper data type format.

In step 332, the unique identification is generated and stored by combining and placing the selectively queried fields in a predetermined format. For example, operating system 218 generates and stores the unique identification in memory 217. In step 342, retrieval of hardware configuration information is initiated. For instance, system command "sysconfig -M" may be used in the Data ONTAP® operating system for initiating retrieval by a user. In step 352, the unique identification for a memory device is retrieved from a stored location and provided in a predetermined format. In memory device 200, the operating system 218 retrieves the intelligent unique identification from memory 217 and displays the information in a serial number display format.

Figure 4:
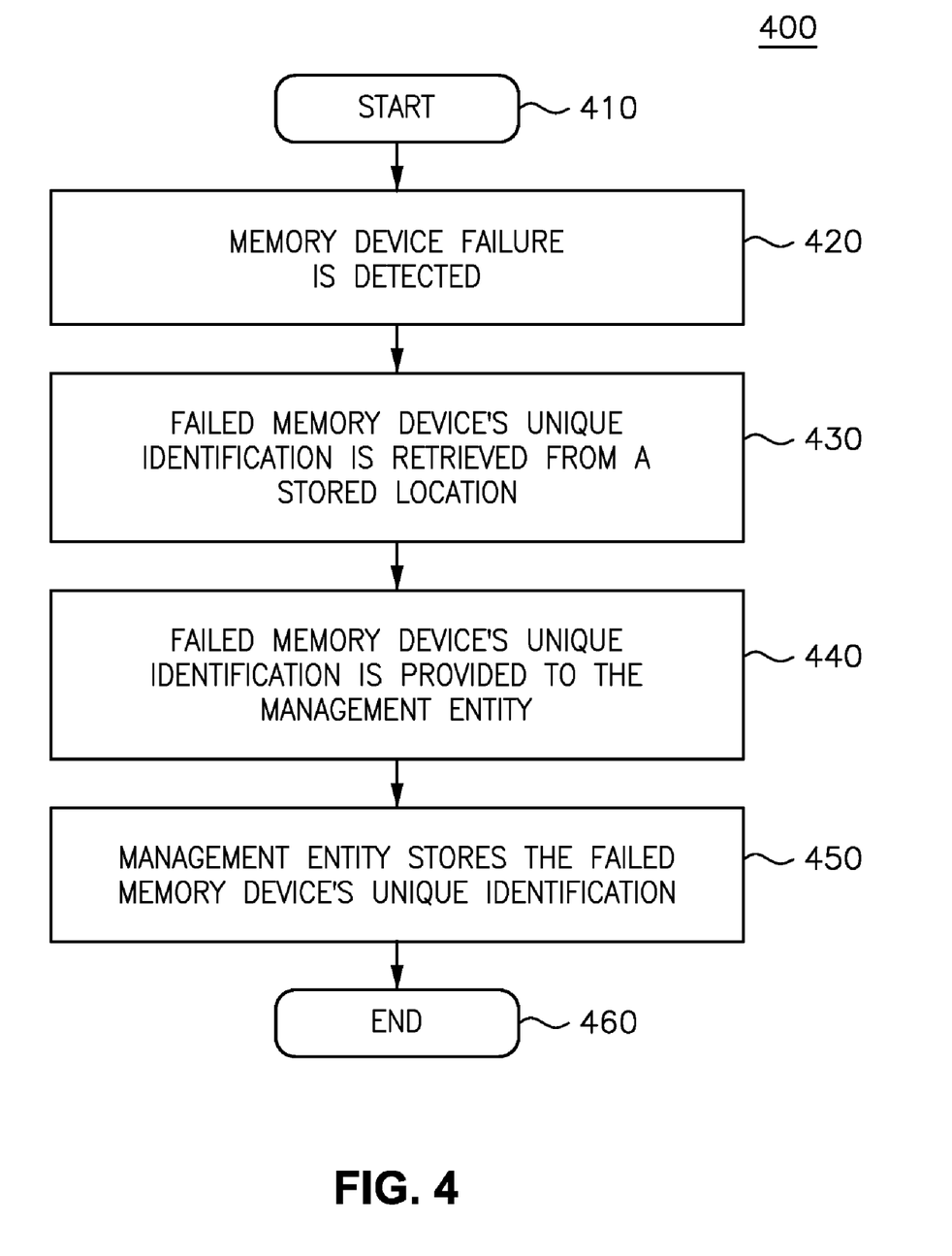
FIG. 4 is a flow diagram of a process for supporting troubleshooting of a memory device in accordance with another embodiment of the present invention.

FIG. 4 is a flow diagram of a process 400 for supporting troubleshooting of a memory device comprising steps 410, 420, . . . 460 in accordance with another embodiment of the present invention. Although process 400 is described for a memory device failure, a software module or operating system can be programmed to provide an intelligent unique identifier of any electronic component subsequent to any predetermined user defined or system event.

In step 420, a memory device failure is detected. Purely as an example, a memory failure may be detected when an error checking and correction (ECC) procedure fails in at least one memory device during a routine or periodic self-test diagnostic procedure performed by the operating system 218. In step 430, the failed memory device's unique identification is retrieved from a stored location. This may be done by operating system 218 which retrieves each failed memory device's unique identification from memory 217 which may have been created during system bootup as explained in FIG. 3B.

In step 440, the failed memory device's unique identification is provided and reported, such as by electronic mail, to the management entity 219. In step 450, the management entity 219 stores the failed memory device's unique identification information such as in memory 217.

Figure 5:
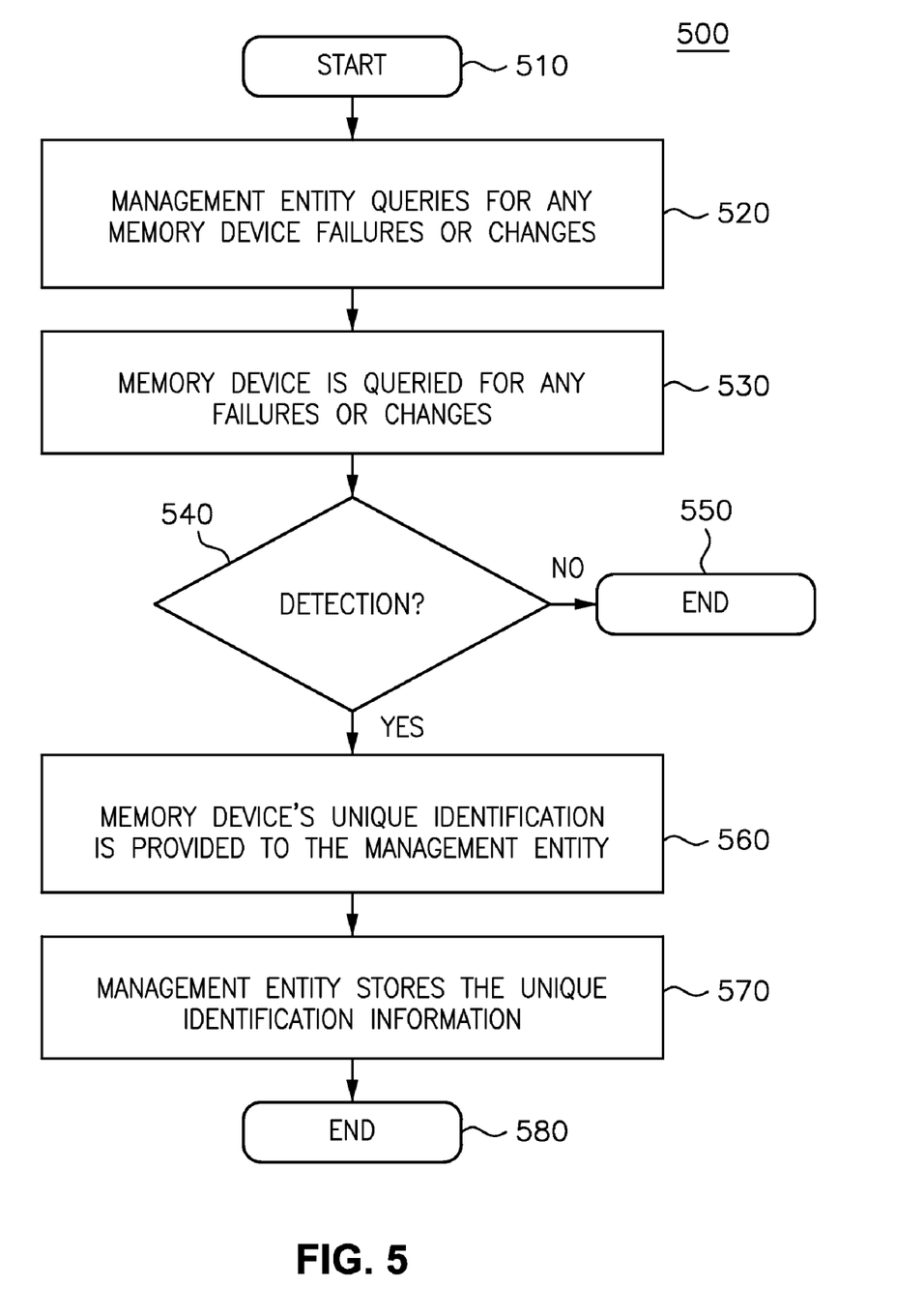
FIG. 5 is a flow diagram of a process wherein a management entity queries and detects the intelligent unique identification of any failed or changed memory device in accordance with another embodiment of the present invention.

FIG. 5 is a flow diagram of a process 500 wherein the management entity 219 queries and detects the intelligent unique identification of any failed or changed memory device in accordance with another embodiment of the present invention comprising steps 510, 520, . . . 580. This process 500 may be implemented periodically, aperiodically, or in response to a particular user request. In step 520, the management entity 219 queries for any memory device failures or changes. For example, a management entity 219 may send a query request or message to operating system 218. In step 530, a memory device is queried for any failures or changes in response to the request. The memory device may be queried by operating system 218 as a result of the request generated by the management entity 219.

In step 540, if a memory device failure or change is detected, the memory device's unique identification is provided to the management entity 219 in step 560. Purely as an example, a memory failure may be detected when an error checking and correction (ECC) procedure fails in at least one memory device during a periodic diagnostic procedure by the storage operating system 218. A change in the memory configuration, such as removal of a memory device, may be detected by a routine system check procedure or a power on self-test (POST) by operating system 218. If no memory device failures or changes are detected, process 500 ends at step 550. In step 570, the management entity 219 stores the detected failed or changed memory device's intelligent unique identification, such as in memory 217.

The present invention can be implemented in a computer program tangibly embodied in a computer-readable storage medium containing a set of instructions for execution by a processor or a general purpose computer, and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method comprising:
   generating a unique identification of a memory device, wherein the identification is unique among memory devices produced by a plurality of manufacturers of memory devices of the same type at the time of generation of the unique identification, wherein the memory device has a duplicate serial number shared by at least one other memory device of the same type either within an inventory among any of said plurality of manufacturers of memory devices of the same type or within an inventory of a manufacturer of the memory device itself, and wherein the memory device stores a plurality of data fields in a serial presence detect (SPD) table, wherein at least two of said data fields include configuration information regarding the memory device, the generating including:
- selectively querying said at least two of said data fields stored in the SPD table to extract contents of the at least two of said data fields, wherein the at least two of said data fields are stored in a first predetermined data type format; and
- re-ordering the extracted contents of the at least two selectively queried data fields of the plurality of data fields to place the contents into a second format without using a hardware or software key provided by the manufacturer of the memory device; and storing the generated unique identification; and
tracking the memory device back to its source of manufacture based on the unique identification and not based on the duplicate serial number.

2. The method of claim 1 wherein the selectively queried data fields includes at least one of a manufacturer identification code field, a manufacturing location field, a manufacturing date field, and a serial number field.

3. The method of claim 1 wherein the selectively querying is performed by an operating system during bootup.

4. The method of claim 3 wherein the operating system retrieves and displays the generated unique identification in response to a system command.

5. The method of claim 3 further comprising detecting a failure of said at least one memory device by the operating system.

6. The method of claim 3, further comprising providing the unique identification of the at least one memory device subsequent to a detected system event from the operating system to a management entity in communication with the operating system.

7. The method of claim 3, further comprising querying the operating system and requesting the unique identification of a failure or change in the at least one memory device, the querying and requesting performed by a management entity in communication with the operating system.

8. The method of claim 1 wherein an operating system converts the selectively queried data fields into the predetermined data type format.

9. The method of claim 1 wherein the predetermined format is an alphanumeric serial number format.

10. A memory device having stored configuration information, the memory device comprising:
- at least a portion of said stored information including configuration data related to said memory device in a serial present detect (SPD) configuration table having a plurality of Joint Electron Device Engineering Council (JEDEC) defined data fields stored in a predetermined data-type format; and
- a unique identifier to identify the memory device in a predetermined format, wherein the identification is unique among memory devices produced by a plurality of manufacturers of memory devices of the same type at the time of generation of the unique identification, wherein the memory device has a duplicate serial number shared by at least one other memory device of the same type either within an inventory among any of said plurality of manufacturers of memory devices of the same type or within an inventory of a manufacturer of the memory device itself, and wherein said unique identifier includes information selectively queried from said plurality of JEDEC defined data fields stored in the predetermined data-type format, the generating including:
- extracting contents of at least two data fields stored in the SPD table, wherein the at least two data fields are selected from any combination of data fields stored in the SPD table selected by a user without using a hardware or software key provided by the manufacturer of the memory device; and
- re-ordering the contents of the at least two data fields stored in the SPD table to place the contents in a second format different from the first data-type format that is unique among memory devices of the same type.

11. The memory device of claim 10 wherein the plurality of JEDEC defined data fields includes at least one of a manufacturer identification code field, a manufacturing location field, a manufacturing date field, and a serial number field.

12. The memory device of claim 10 wherein the unique identifier is stored on a machine readable tag on an outer portion of the memory device.

13. The memory device of claim 12 wherein the machine readable tag is any one of a bar code or a radio frequency identification (REID) tag.

14. The memory device of claim 10 wherein the unique identifier is displayed in a human readable format on an outer portion of the memory device.

15. A storage system providing backup of data, the storage system comprising:
- a storage medium for storing data;
- an associated database for managing a memory device, the memory device including a serial presence detect (SPD) configuration table including a plurality of data fields having configuration information related to the memory device,
- a management entity configured to generate a unique identification of the memory device in a predetermined format using contents of selectively queried data fields of the plurality of data fields, wherein the identification is unique among memory devices produced by a plurality of manufacturers of memory devices of the same type at the time of generation of the unique identification, wherein the memory device has a duplicate serial number shared by at least one other memory device of the same type either within an inventory among any of said plurality of manufacturers of memory devices of the same type or within an inventory of a manufacturer of the memory device itself, the generating including:
  - selectively querying at least two data fields stored in the SPD configuration table to extract their contents, wherein the at least two of said data fields stored in the SPD table include configuration information about the memory device, and wherein the at least two data fields are selected from any combination of data fields stored in the SPD table chosen by a user without applying a hardware or software key provided by the manufacturer of the memory device; and
  - re-ordering the contents of the at least two selectively queried data fields to place the contents in a second format different from the first data-type format that is unique among memory devices of the same type; and
- store the unique identification in the database; and
- track the memory device back to its source of manufacture based on the unique identification instead of based on the duplicate serial number.

16. The storage system of claim 15 wherein the selectively queried data fields includes at least one of a manufacturer identification code field, a manufacturing location field, a manufacturing date field, and a serial number field.

17. The storage system of claim 15 wherein the storage medium is any one of a tape library, a disk library, an optical media library, or a virtual storage library.

18. A computer-readable storage medium having stored thereon a set of instructions for a computer, which cause the computer to perform a method, the set of instructions comprising:

a code segment for generating a unique identification for the electronic component, wherein the identification is unique among electronic components produced by a plurality of manufacturers of electronic components of the same type at the time of generation of the unique identification, and wherein the electronic component has a duplicate serial number shared by at least one other electronic component of the same type either within an inventory among any of said plurality of manufacturers of electronic components of the same type or within an inventory of a manufacturer of the electronic component itself, the code segment for generating the unique identification including:

a code segment for selectively querying data fields in a serial presence detect (SPD) configuration table of the electronic component during bootup of the computer; and a code segment for generating a unique identification of the electronic component by re-ordering the contents of the selectively queried data fields into a predetermined format without using a hardware or software key provided by the manufacturer of the electronic component; and a code segment for providing the unique identification to a management entity subsequent to a predetermined system event.

19. A method comprising:

generating an identification for the electronic component, wherein the identification is unique among memory devices produced by a plurality of manufacturers of memory devices of the same type at the time of generation of the unique identification, wherein the memory device has a duplicate serial number shared by at least one other memory device of the same type either within an inventory among any of said plurality of manufacturers of memory devices of the same type or within an inventory of a manufacturer of the memory device itself, the generating including:

extracting at least two data fields stored in a serial presence detect (SPD) table in a first data type format having a standardized Joint Electron Device Engineering Council (JEDEC) format, wherein the at least two of the data fields stored in the SPD table include information about the electronic component, and wherein the at least two data fields are stored in a predetermined data-type format, and wherein the at least two data fields are selected from any combination of data fields stored in the SPD table chosen by a user without using a hardware or software key provided by the manufacturer of the memory device; and re-ordering the contents of the at least two extracted data fields to place the contents in a second format different from the first data-type format that is unique among electronic components of the same type; and storing the generated unique identification; and tracking the electronic component back to its source of manufacture based on the unique identification only instead of based on the duplicate serial number.

20. The method of claim 19, wherein the extracted data fields include at least one of a manufacturer identification code field, a manufacturing location field, a manufacturing date field, and a serial number field.

21. The method of claim 19, wherein the extracting is performed by an operating system during bootup.

22. The method of claims 21, wherein the operating system retrieves and displays the generated unique identification in response to a system command.

23. The method of claim 21, further comprising detecting a failure of said at least one memory device by the operating system.

24. The method of claim 21, further comprising providing the unique identification of the at least one memory device subsequent to a detected system event from the operating system to a management entity in communication with the operating system.

25. The method of claim 24, further comprising querying the operating system and requesting the unique identification of a failure or change in the at least one memory device, the querying and requesting performed by the management entity in communication with the operating system.

* * * * *

UNITED STATES PATENT AND TRADEMARK OFFICE
CERTIFICATE OF CORRECTION

PATENT NO. : 7,707,369 B2  Page 1 of 2
APPLICATION NO. : 11/537183
DATED : April 27, 2010
INVENTOR(S) : Nulkar et al.

It is certified that error appears in the above-identified patent and that said Letters Patent is hereby corrected as shown below:

In column 7, line 14, claim 1, delete "device; and" and insert -- device; --.
In column 7, line 21, claim 2, delete "includes" and insert -- include --.
In column 7, line 31, claim 5, delete "at least one".
In column 7, line 34, claim 6, delete "at least one".
In column 7, line 40, claim 7, delete "at least one".
In column 7, line 44, claim 8, delete "the predetermined" and insert -- the first predetermined --.
In column 7, line 47, claim 9, delete "the predetermined" and insert -- the first predetermined --.
In column 7, line 51, claim 10, delete "stored information" and insert -- stored configuration Information --.
In column 7, line 53, claim 10, delete "configuration table" and insert -- table --.
In column 7, line 55, claim 10, delete "a predetermined data-type" and insert -- a first predetermined --.
In column 7, line 58, claim 10, delete "a predetermined" and insert -- the first predetermined --.
In column 8, line 3, claim 10, delete "the predetermined data-type" and insert -- the first predetermined --.
In column 8, line 4, claim 10, delete "the generating including" and insert -- wherein the generation includes --.
In column 8, line 14, claim 10, delete "the first data-type" and insert -- the first predetermined --.
In column 8, line 25, claim 13, delete "REID" and insert -- RFID --.
In column 8, line 34, claim 15, delete "configuration table" and insert -- table --.
In column 8, line 49, claim 15, delete "the generating including" and insert -- wherein the generation includes --.
In column 8, line 52, claim 15, delete "configuration table" and insert -- table --.
In column 8, line 63, claim 15, delete "the first data-type" and insert -- the predetermined --.
In column 8, line 64, claim 15, delete "type; and" and insert -- type; --.
In column 9, line 2, claim 16, delete "includes" and insert -- include --.
In column 9, line 13, claim 18, delete "the electronic" and insert -- an electronic --.
In column 9, line 29, claim 18, delete "a unique" and insert -- the unique --.
In column 9, line 39, claim 19, delete "the electronic component" and insert -- a memory device --.
In column 10, line 9, claim 19, delete "electronic component" and insert -- memory device --.
In column 10, line 19, claim 19, delete "electronic components" and insert -- memory devices --.
In column 10, line 21, claim 19, delete "electronic component" and insert -- memory device --.

Signed and Sealed this

Third Day of August, 2010

David J. Kappos
*Director of the United States Patent and Trademark Office*

CERTIFICATE OF CORRECTION (continued)
U.S. Pat. No. 7,707,369 B2

In column 10, line 34, claim 23, delete "at least one".
In column 10, line 37, claim 24, delete "at least one".